United States Patent [19]
Smeets et al.

[11] Patent Number: 6,045,474
[45] Date of Patent: Apr. 4, 2000

[54] DRIVE BELT, ELEMENT THEREFOR AND CONSTRUCTION IN WHICH THIS IS USED

[75] Inventors: Paulus Maria Smeets, Tilburg; Johannes Hendrikus Van Lith, Berticum, both of Netherlands

[73] Assignee: Van Doorne's Transmissie B.V., Tilburg, Netherlands

[21] Appl. No.: 09/134,942

[22] Filed: Aug. 17, 1998

[30] Foreign Application Priority Data

Aug. 15, 1997 [NL] Netherlands ............................ 1006776

[51] Int. Cl.$^7$ ................................. F16G 1/28; F16G 1/21
[52] U.S. Cl. ............................ 474/249; 188/201; 188/245
[58] Field of Search .................................. 474/249, 251, 474/242, 238, 243, 261, 188, 201, 174, 240

[56] References Cited

U.S. PATENT DOCUMENTS

| | | | |
|---|---|---|---|
| 4,718,881 | 1/1988 | Sugimoto et al. | 474/201 X |
| 4,826,473 | 5/1989 | Miyawaki | 474/240 |
| 5,011,461 | 4/1991 | Brouwers | 474/249 X |

FOREIGN PATENT DOCUMENTS

| | | |
|---|---|---|
| 0 381 258 | 8/1990 | European Pat. Off. . |
| 59-097344 | 6/1984 | Japan . |
| 60-081537 | 5/1985 | Japan . |
| 60-136650 | 7/1985 | Japan . |
| 5-010405 | 1/1993 | Japan . |

*Primary Examiner*—David A. Bucci
*Assistant Examiner*—Marcus Charles
*Attorney, Agent, or Firm*—Young & Thompson

[57] ABSTRACT

A drive belt for a continuously variable transmission having belt discs having an at least partially conical contact surface for enclosing a drive belt between pairs of said discs, which drive belt to this end comprises one or more transverse elements provided with converging side faces intended to come into contact with the contact surface of a belt disc and wherein one or more side faces possess a surface which has protuberances providing a profile, which surface has therein contact faces, defined by the protuberances, for coming into contact with the contact surface of a belt disc, wherein the profile is shaped such that on cross-sectioning parallel to the side face concerned, or after wear of the profile at or down to a level which is located at least thirty percent and at most seventy percent of the profile height beneath the initial profile height, the surface area effectively available for coming into contact with the contact surface of a belt disc lies within the range of forty to sixty percent with respect to the dimensions of the side face in which the contact faces are present.

13 Claims, 3 Drawing Sheets

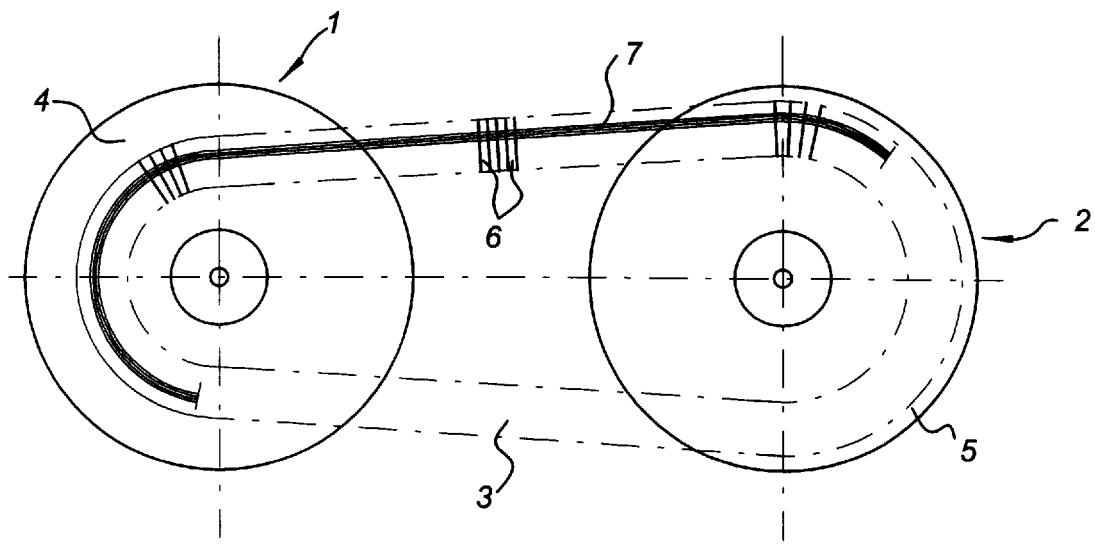
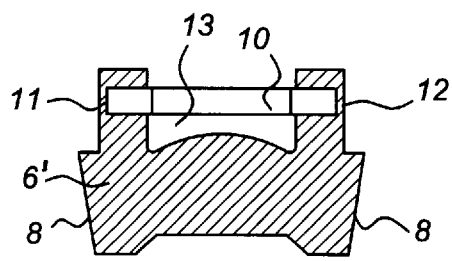
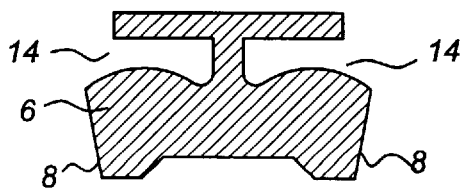

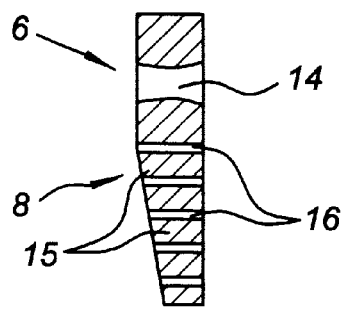
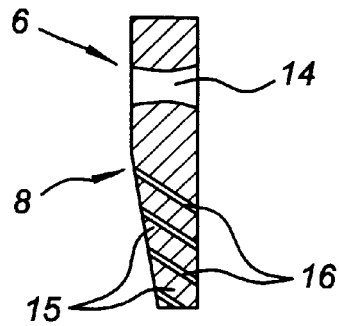
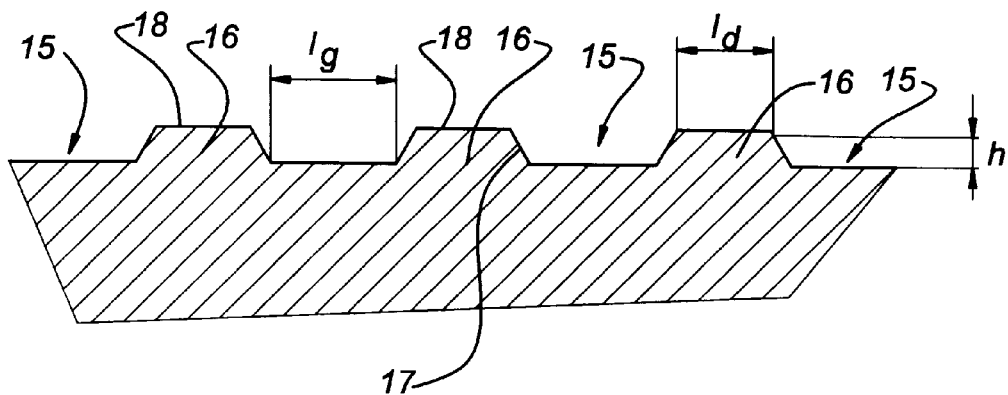
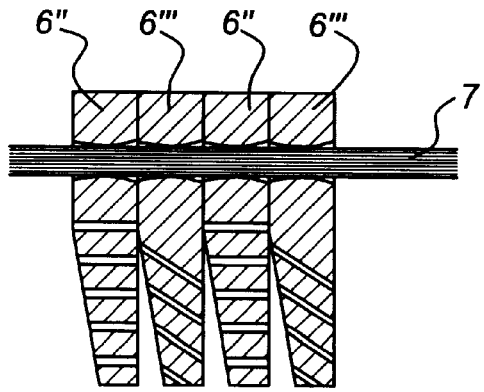

DRIVE BELT, ELEMENT THEREFOR AND CONSTRUCTION IN WHICH THIS IS USED

BACKGROUND OF THE INVENTION

The present invention relates to, inter alia, a drive belt for a continuously variable transmission having belt discs having an at least partially conical contact surface for enclosing a drive belt between pairs of said discs, which drive belt to this end comprises one or more transverse elements provided with converging side faces intended to come into contact with the contact surface of a belt disc and wherein one or more side faces possess a surface which has protuberances providing a profile, which surface has therein contact faces, defined by the protuberances, for coming into contact with the contact surface of a belt disc.

DESCRIPTION OF THE RELATED ART

A drive belt of this type, also referred to as a belt, is disclosed in European Patent Application 0 381 258. In this belt the elements have a predetermined profiled contact surface having protuberances formed by ridges and having recesses formed by grooves. In the known construction the width of the contact face of a ridge, measured "in the profile", is at most 100 μm and the width of a groove is less than or equal to 300 μm, the grooves taking up at least fifty percent of the total surface in which they are present. The drive belt operates together with a set of belt discs in combination with supplied oil, which inter alia serves to remove heat. In the known construction the ratio between the surface dimensions of protuberances and grooves is optimized with respect to the discharge of oil into the grooves and collection of oil in said grooves, in order to prevent slip between drive belt and belt disc. The known construction has the disadvantage that when the transmission is taken into use for the first time damage to the pulley and belt, or breakage of the belt, can occur initially.

SUMMARY OF THE INVENTION

The aim of the present invention is at least advantageously to overcome or substantially to prevent this phenomenon, at least to obtain an improved profile, preferably a profile shaped such that, in order to prevent the abovementioned problems, optimum account is taken of physical phenomena which arise between drive belt and belt disc during running in.

According to the invention this is achieved when the profile is shaped such that on cross-sectioning parallel to the side face concerned or after wear of the profile at or down to a level located at least thirty percent and at most seventy percent of the profile height beneath the initial profile height, the surface area effectively available for coming into contact with the contact surface of a belt disc lies within the range of forty to sixty percent with respect to the dimensions of the side face in which the contact faces are present. In accordance with the insight on which the invention is based, a construction of this type advantageously provides a possibility for running in the drive belt and provides an advantageous shape for the protuberances which, whilst retaining advantageous ratios with respect to discharge of oil into the grooves and collection of oil in said grooves, is optimized with respect to correct and advantageous running-in wear and which prevents damage and has a beneficial effect on the period for which the belt can be put under load. Running-in in accordance with the invention is possible by means of wearing down profile sections in the outermost layer of the profile to a depth of, for example, approximately 10 μm, in which layer the proportion of the profile that acts as a bearing surface is small, and thus the possibility of wear is high. Such an optimum possibility for initial wear prevents elements of the drive belt eating into the contact surface of the pulley, or giving rise to irregularities, such as scores, therein, during running-in of a belt and pulley combination. This possibility arises, for example, as a consequence of variation in width of successive elements in a belt, or the inequality therein with respect to an imaginary plane of symmetry between two pulley discs, or as a consequence of variation in the angle of the flanks of the elements. Such an element can be forced radially outwards under the pressure of the pulleys so that an adversely high tension and a local adversely high load on an innermost band of a composite band of the drive belt would be created. The possibility for initial wear created according to the invention thus also leads to optimum seating of a belt/pulley combination and also prevents belt breakage or damage to the pulley on running-in a relatively wide element between two pulley discs.

The construction according to the invention also has the advantage that the contact surface is initially minimal but, as a result of the preferably sinusoidal shape, relatively rapidly decreases by wear in a controlled manner until an equilibrium situation is reached in which further wear is negligible. The shape proposed according to the invention also has the advantage that the proportion of the contact surfaces which act as bearing surfaces adjust in an optimum manner in a belt/pulley combination to possibly varying values in hardness of the material of either the disc or the elements, or to a possibly varying composition of the material thereof.

It is pointed out that Japanese Patent Application 58-189587 discloses an element which has a contact surface that possesses an infinite number of minute projections, apparently present in stochastic distribution. The initial contact of said surface is at least twenty percent in order to prevent slip and wear. In contrast to what is disclosed in the said Japanese patent application, the aim in the present invention is for a slight but controlled degree of initial wear. The document provides no information on possible dimensions or tolerances of the shape of the projections.

The Derwent abstract of Japanese Patent Application 3-185686 discloses a contact surface having micro-irregularities obtained by so-called shot blasting. To increase resistance to wear, the rough surface thus obtained is smoothed until a specific proportion of the projections acting as bearing surfaces is reached. In contrast to this known construction, the present invention teaches that initial wear of the elements must be achieved during running-in of a belt in order thus to prevent shock loading, which can arise as a consequence of an unfavourable sequence of successive elements in a belt and of elements varying in width within a tolerance.

BRIEF DESCRIPTION OF THE DRAWINGS

The invention will be explained in more detail below with reference to a drawing and a number of embodiments. In the drawing:

FIG. 1 is a diagrammatic illustration of a transmission known per se to which the invention relates;

FIG. 2 is a transverse view of a possible embodiment of a transverse element for a drive belt;

FIG. 3 is a transverse view of another embodiment for a transverse element for a drive belt;

FIGS. 4a and 4b are longitudinal views of the transverse element from FIG. 3 with, respectively, straight and oblique grooves, in accordance with the prior art;

FIG. 5 is a diagrammatic cross-section of a groove pattern in accordance with the prior art;

FIG. 6 is a vertical projection of one side of part of a mixed drive belt according to the prior art;

DESCRIPTION OF THE PREFERRED EMBODIMENTS

Figure 7:
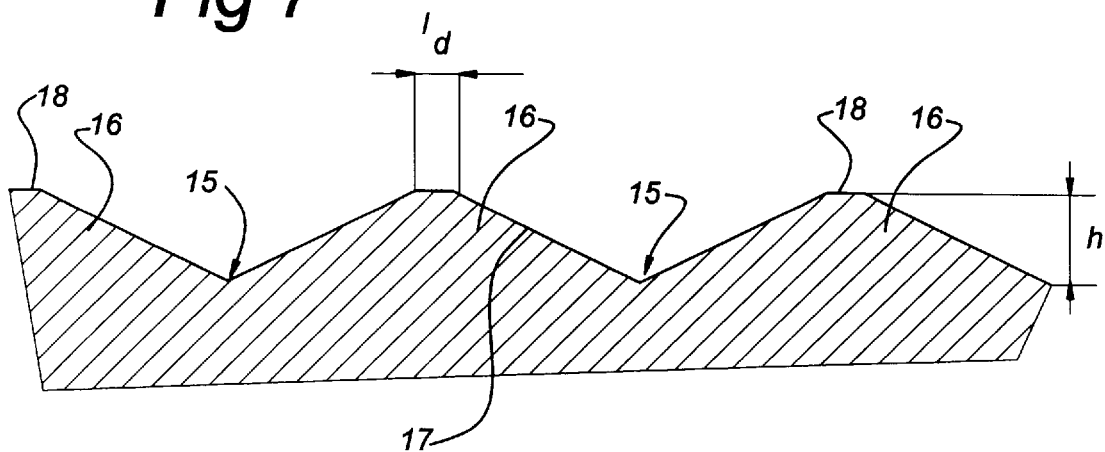
FIG. 7 is a view corresponding to FIG. 6 of a profile according to the invention.

The drive in FIG. 1 comprises a pair of slightly conical belt discs 1, 2 with a drive belt 3 fitted between them. In this embodiment the drive belt is provided with a support 7, on which the transverse elements 6 are movably mounted. One embodiment of such a transverse element is shown in FIG. 2. The transverse element 6' concerned is provided with a recess 13 for accommodating a support which, for example, can consist of a bundle of metal bands. Said recess 13 can be closed at the top by means of a locking pin 10, which can be fitted in the bores 11 and 12 of the transverse element 6'. Another embodiment of a transverse element is shown in FIG. 3. In this case the transverse element 6 concerned has a pair of recesses 14 in which a support 7 can be accommodated. The support 7 is usually formed by a bundle of continuous elements, such as flat, flexible metal bands, placed one on top of the other. In both embodiments the transverse elements, 6 and 6' respectively, are provided with converging side faces 8 which are able to engage on the respective conical contact surfaces 4 and 5 of the belt discs 1 and 2, which are usually arranged at an angle of approximately 11°. With this arrangement an oil film can be formed between the contact surfaces 4 and 5 on one side and the side faces 8 on the other side, as a consequence of which the drive belt is able to slip with respect to the belt discs 1 and 2 and as a result of which the transmitted torque decreases. The efficiency of the transmission will decrease as a result and excessive wear can occur. In order to prevent this the side faces 8 and/or the contact surfaces 4, 5 must be discontinuous or roughened.

FIGS. 4a and 4b illustrate the transverse elements 6 having side faces 8 provided with a profiled surface. Here the profile is defined by recesses in the form of grooves 15, which are parallel or oblique with respect to the longitudinal direction of the support 7, between protuberances in the form of ridges 16, which likewise can run parallel or obliquely with respect to the support 7. For the sake of simplicity, reference will always be made below to the grooved surfaces of the transverse elements; however, it will be clear that the same applies correspondingly to the contact surfaces 4 and 5 of the respective belt discs 1 and 2 and to profiles which are formed by gritting, shot blasting or shot peening. For further explanation of the invention it is, in essence, not important as to what is the precise pattern of the protuberances, for example formed stochastically as by shot blasting or formed in a predetermined manner and in this case with grooves or protuberances which, for example, are straight, oblique, stepped, curved or of some other shape.

FIG. 5 is a cross-section of a groove profile known per se, at right angles to the contact surface 8 and in the lengthwise or depth direction thereof. The profile comprises ridges 16, which have an effective width Ld, and grooves positioned between said ridges, said grooves having an effective width Lg. The grooves act as a facility for receiving and removing the oil. It is desirable to remove oil rapidly so that there is no risk of an oil film being formed between the contact surfaces of transverse element and belt disc or, if an oil film has already been formed, to break this up and reduce it as quickly as possible. In order to achieve this, in accordance with the invention the effective width Ld of the ridges must be sufficiently small, so that the oil has to be moved only over a limited distance before it is collected in the grooves.

It has also been found that, apart from the effective width Lg of the groove 15 and the effective width Ld of the ridge 16, the total groove surface, that is to say also the groove depth h, is important. According to the invention, said groove depth is preferably within the range of 15–30 $\mu$m, so that there is a possibility of running-in or initial wear and that, on the one hand, even after running-in of the belt, or after wear of the side faces 8 of the elements, adequate groove volume is obtained, so that sufficient oil can be collected, and so that, on the other hand, the groove depth or the height of the protuberances or depth of the recesses is not so high that this causes failure of the protuberances.

Figure 8:
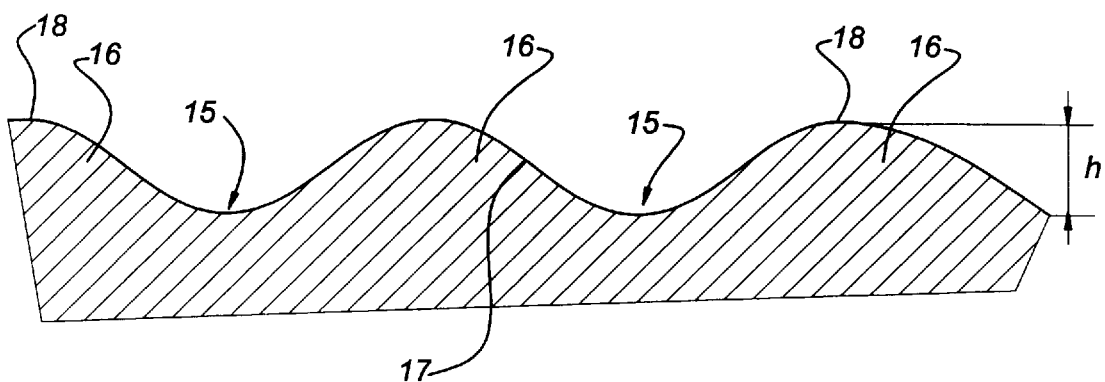
FIG. 8 is a view corresponding to FIG. 6 of an alternative profile according to the invention.
Figure 9:
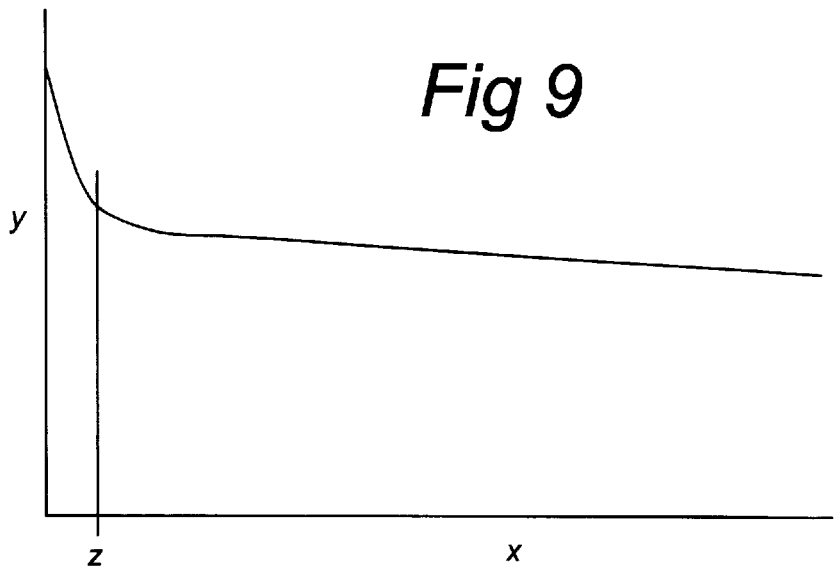
FIG. 9 is an illustrative plot of the course of wear of the profile with respect to the rotational speed of the drive belt.

FIGS. 7 and 8 show alternatives of novel profiles, formed in accordance with the insights on which the invention is based, for the side faces 8. A good flow of the oil from a ridge 16 into the groove 15 is retained with these designs, so that a non-uniform flow with an undesirable pressure built-up is prevented with a relatively high degree of certainty. A sinusoidal profile is preferably used according to the invention. This profile on the one hand complies with the concept on which the present invention is based, that some degree of wear of the flank profile is desirable, because the profile has an initially minimal contact surface so that initial wear proceeds rapidly and easily, whilst, on the other hand, an at least quasi-equilibrium situation, in which the proportion acting as bearing surface is approximately fifty percent, is reached relatively rapidly. The proportion acting as bearing surface is the ratio of the surface area of the protuberances, or the surface area of all protuberances in a side face 8 which is effectively available to bear on a belt disc 1 and 2, to the total surface area in which the protuberances or recesses are accommodated, for example the surface area that is defined by the height and width of the side faces 8. The sinusoidal profile also has the advantage that the recesses do not have any sharp corners which could cause damage to the disc during running-in and that the resistance to failure is relatively high. Nevertheless, a ridge 16 according to the invention viewed in cross-section can be completely triangular, although fractional smoothing of the protuberances can be employed in connection with the sharpness of the point. After only slight running-in wear on the ridge 16, the contact face 18 of the ridge 16, which contact face runs parallel to the side face 8, will be so large that the ridge 16 undergoes only elastic deformation when subjected to contact stress with belt discs and wear is minimised. In this context FIG. 9 illustrates the change in the average height h of the protuberance, plotted on the Y axis ("Y"), as a consequence of wear, as a function of the speed of revolution ("X") of the drive belt in a drive belt and belt disc unit according to FIG. 1. The profile according to the invention has been optimised for advantageous utilisation of the initial wear of the elements, which phase changes close to point Z, after a few tens of thousands to a few hundreds of thousands of complete revolutions of the belt, into a quasi-steady situation in which the degree of wear of the profile tends towards zero.

The shape of a protuberance developed according to the invention promotes very rapid seating of a combination of belt disc with drive belt, which is beneficial with regard to the period for which the belt can be subjected to load. On the other hand, as a result of stabilization of the proportion available as bearing surface at between forty and sixty percent and preferably approximately fifty percent after initial wear of thirty to seventy percent of the profile height, the shape according to the invention prevents clearing of oil to collection of oil in the grooves being adversely affected or the width of an element decreasing to such an extent that problems arise in relation to the margins for the distance between drive belt axis and element or between the belt disc 4, 5 and the bands 7. In a specific embodiment, a protuberance, at the height at which quasi-stabilisation of wear is considered to take place or takes place, has a width which, viewed "in profile" in accordance with FIGS. 7 and 8, is at most approximately, that is to say plus or minus 10 percent, 13 $\mu$m, preferably approximately 8 $\mu$m. The mutual spacing of the protuberances, that is to say the center-to-center distance, must be approximately three times as great in this case.

What is claimed is:

1. Drive belt for a continuously variable transmission having belt discs having an at least partially conical contact surface for enclosing a drive belt between pairs of said belt discs, said drive belt comprising:

one or more transverse elements provided with converging side faces for coming into contact with a contact surface of a belt disc and said one or more side faces possessing a surface which has protuberances providing a profile, which surface has therein contact faces, defined by the protuberances, for coming into contact with the contact surface of the belt disc, the profile being shaped such that on cross-sectioning parallel to the side face concerned at a level which is located at least thirty percent and at most seventy percent of the profile height (h) beneath the initial profile height (h), or after wear of the profile down to a level which is located at least thirty percent and at most seventy percent of the profile height (h) beneath the initial height (h), the surface area effectively available for coming into contact with the contact surface of the belt disc lies within the range of forty to sixty percent with respect to the dimensions of the side face in which the contact faces are present.

2. Drive belt according to claim 1, further comprising a protuberance provided with outwardly converging flanks.

3. Drive belt according to claim 1, wherein the profile has an essentially sinusoidal shape.

4. Drive belt according to claim 1, wherein the profile has a depth which is at least approximately 20 $\mu$m.

5. Drive belt according to claim 1, wherein the outside of the profile has a fractionally smoothed shape.

6. Drive belt according to claim 1, wherein a protuberance produced as a ridge has a width (Ld) of at most approximately 0.13 $\mu$m at the height of the said level after wear or cross-sectioning and the mutual ridge spacing is at least twice as great.

7. Drive belt according to claim 1, wherein a protuberance produced as a ridge has a width (Ld) of at most approximately 0.13 $\mu$m at the height of the said level after wear or cross-sectioning and the mutual ridge spacing is at least three times as great.

8. A transverse element for accommodation in a drive belt for a continuously variable transmission, said transverse element comprising converging side faces for coming into contact with a contact surface of a belt disc and said one or more side faces possessing a surface which has protuberances providing a profile, which surface has therein contact faces, defined by the protuberances, for coming into contact with a contact surface of the belt disc, the profile being shaped such that on cross-sectioning parallel to the side face concerned at a level which is located at least thirty percent and at most seventy percent of the profile height (h) beneath the initial profile height (h), or after wear of the profile down to a level which is located at least thirty percent and at most seventy percent of the profile height (h), beneath the initial height (h), the surface area effectively available for coming into contact with the contact surface of the belt disc lies within the range of forty to sixty percent with respect to the dimensions of the side face in which the contact faces are present.

9. A belt disc for a continuously variable transmission comprising a contact surface in a radial direction profiled correspondingly to a side face of a drive belt between pairs of said belt discs, said drive belt comprising:

one or more transverse elements provided with converging side faces for coming into a contact with a contact surface of a belt disc and said one or more side faces possessing a surface which has protuberances providing a profile, which surface has therein contact faces, defined by the protuberances, for coming into contact with the contact surface of the belt disc, the profile being shaped such that on cross-sectioning parallel to the side face concerned at a level which is located at least thirty percent and at most seventy percent of the profile height (h) beneath the initial profile height (h), or after wear of the profile down to a level which is located at least thirty percent and at most seventy percent of the profile height (h) beneath the initial height (h), the surface area effectively available for coming into contact with the contact surface of the belt disc lies within the range of forty to sixty percent with respect to the dimensions of the side face in which the contact faces are present.

10. Belt disc according to claim 9, wherein the profile is provided with a single continuous, essentially concentric ridge or plural essentially concentrically arranged ridges.

11. A continuously variable transmission comprising belt discs having an at least partially conical contact surface for enclosing a drive belt between pairs of said belt discs, said drive belt comprising:

one or more transverse elements provided with converging side faces for coming into contact with a contact surface of a belt disc and said one or more side faces possessing a surface which has protuberances providing a profile, which surface has therein contact faces, defined by the protuberances, for coming into contact with the contact surface of the belt disc, the profile being shaped such that on cross-sectioning parallel to the side face concerned at a level which is located at least thirty percent and at most seventy percent of the profile height (h) beneath the initial profile height (h) or after wear of the profile down to a level which is located at least thirty percent and at most seventy percent of the profile height (h) beneath the initial height (h), the surface area effectively available for coming into contact with the contact surface of the belt disc lies within the range of forty to sixty percent with respect to the dimensions of the side face in which the contact faces are present.

12. Drive belt according to claim 1, wherein the profile has a depth which is at most approximately 30 $\mu$m.

13. Drive belt according to claim 1, wherein the profile has a depth of approximately 25 $\mu$m.

\* \* \* \* \*